US006353920B1

(12) United States Patent
Wittig et al.

(10) Patent No.: US 6,353,920 B1
(45) Date of Patent: Mar. 5, 2002

(54) METHOD FOR IMPLEMENTING WIDE GATES AND TRISTATE BUFFERS USING FPGA CARRY LOGIC

(75) Inventors: Ralph D. Wittig, Menlo Park; Sundararajarao Mohan, Cupertino; Hamish T. Fallside, Los Gatos, all of CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/193,283

(22) Filed: Nov. 17, 1998

(51) Int. Cl.[7] .................. G06F 17/50; G06F 7/38; H03K 17/693; H03K 19/00; H03K 19/177
(52) U.S. Cl. .................. 716/16; 17/2; 17/18; 17/3; 326/39; 326/41
(58) Field of Search .................. 716/16, 17

(56) References Cited

U.S. PATENT DOCUMENTS

| 5,349,250 A | * | 9/1994 | New | 307/465 |
| 5,442,306 A | * | 8/1995 | Woo | 326/39 |
| 5,481,206 A | * | 1/1996 | New et al. | 326/38 |
| 5,606,266 A | * | 2/1997 | Pedersen | 326/41 |
| 5,629,886 A | * | 5/1997 | New | 364/487 |
| 5,761,099 A | * | 6/1998 | Pedersen | 364/716.01 |
| 5,811,985 A | * | 9/1998 | Trimberger et al. | 326/38 |
| 5,859,542 A | * | 1/1999 | Pedersen | 326/39 |
| 5,861,761 A | * | 1/1999 | Kean | 326/41 |
| 5,889,411 A | * | 3/1999 | Chaudhary | 326/39 |
| 5,898,318 A | * | 4/1999 | Pedersen | 326/39 |
| 5,903,165 A | * | 5/1999 | Jones et al. | 326/39 |
| 6,043,676 A | * | 3/2000 | Mendel et al. | 326/39 |
| 6,081,914 A | * | 6/2000 | Chaudhary | 714/724 |
| 6,118,300 A | * | 9/2000 | Wittig et al. | 326/41 |
| 6,150,842 A | * | 11/2000 | Agrawal et al. | 326/41 |
| 6,175,247 B1 | * | 1/2001 | Scalera et al. | 326/39 |

FOREIGN PATENT DOCUMENTS

EP 0748049 A2 * 11/1996
WO WO-9832229 A1 * 7/1998

OTHER PUBLICATIONS

E. Macii et al., FPGA Synthesis Using Look–Up Table and Multiplexor Based Architectures, Proceedings, 7th Mediterranean Electrotechnical Conference, pp. 302–305, vol. 1, Apr. 1994.*

(List continued on next page.)

Primary Examiner—Matthew Smith
Assistant Examiner—A. M. Thompson
(74) Attorney, Agent, or Firm—Edel M. Young; LeRoy D. Maunu

(57) ABSTRACT

A method for implementing wide gates and tristate buses using FPGA carry logic. Wide gate logic functions and tristate buses are detected and implemented with a plurality of LUTs and carry multiplexers. The wide gate functions are of the form:

$$F_f=(( \ldots (f_0 \$ f_1) \$ f_2) \$ f_3) \ldots ) \$ f_m,$$

where $ represents a logic operator such as AND, OR or XOR.
Thus the method includes the commonly used functions $F_{AND}=i_1$ AND $i_2$ AND $i_3$ AND $\ldots i_n$; and $F_{OR}=i_1$ OR $i_2$ OR $i_3 \ldots i_n$ as well as many mixed functions. The LUTs implement the respective portions of functions $f_0$ through $f_m$ and the carry multiplexers implement the logic operators that connect the functions in a cascaded manner. A tristate bus definition includes a plurality of bus input signals and a plurality of bus select signals, each of the bus input signals associated with one or more of the bus select signals. The tristate bus is implemented by applying input and enable signals of the tristate bus to LUT input terminals, implementing inverted sum-of products of the input and enable signals and applying the output signals to the carry chain.

35 Claims, 9 Drawing Sheets

OTHER PUBLICATIONS

J. Pal Singh, A Multiplier Generator for Xilinx FPGAs, Ninth International Conference on VLSI Design, pp. 322–323, Jan. 1996.*

"The Programmable Logic Data Book", published 1998, available from Xilinx, Inc., 2100 Logic Drive, San Jose, California 95124.

"Altera Data Book", published Mar., 1995, available from Altera Corporation, 2610 Orchard Parkway, San Jose, CA 95134–2020, pp. 42–46.

* cited by examiner

METHOD FOR IMPLEMENTING WIDE GATES AND TRISTATE BUFFERS USING FPGA CARRY LOGIC

FIELD OF THE INVENTION

The invention relates to Field Programmable Gate Arrays (FPGAs). More particularly, the invention relates to a method for synthesizing wide gates into carry logic in an FPGA.

BACKGROUND

Programmable integrated circuits (ICs) are a well-known type of integrated circuit that may be programmed by a user to perform specified logic functions. (The term "programmable ICs" as used herein includes but is not limited to FPGAs, mask programmable devices such as Application Specific ICs (ASICs), Programmable Logic Devices (PLDs), and devices in which only a portion of the logic is programmable.) One type of programmable IC, the field programmable gate array (FPGA), typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are typically programmed by loading a stream of configuration data (bitstream) into internal configuration memory cells that define how the CLBs, IOBs, and interconnect structure are configured. The configuration data may be read from memory (e.g., an external PROM) or written into the FPGA by an external device. The collective states of the individual memory cells then determine the function of the FPGA.

A CLB typically includes one or more function generators (often implemented as lookup tables, or LUTs), and one or more registers that can optionally be used to register the LUT outputs. Some CLBs also include carry logic that is used to implement arithmetic functions such as adders, subtractors, counters, and multipliers. Implementing logic using carry chains can be faster, sometimes much faster, than implementing the equivalent logic in LUTs and passing carry signals from one bit to the next through the interconnect structure. The speed of a carry chain depends on the number of bits in the carry chain and the speed of each carry bit (among other factors). The speed of the equivalent logic implemented as LUTs depends on the number of levels of logic (i.e., the number of LUTs on the slowest path) required to implement the function. Usually, using the carry chain is faster. However, using the carry chain imposes placement constraints because the ordering of portions of the user's function is set by the carry chain.

Two forms of design entry are common: schematic entry and Hardware Description Languages (HDLs) such as Verilog and VHDL. When schematic entry is used, the designer specifies the exact implementation desired for his circuit. At a higher level, when HDL code is used, the circuit is described by its logical function. Synthesis software then translates the logical function into specific logic targeted for a specified FPGA. Although circuit elements can be manually instantiated in HDL code, this method is avoided since it is labor-intensive and the code can typically only be targeted to a specific programmable IC architecture.

Well-known synthesis tools such as those distributed by Synopsys, Inc., of Mountain View, Calif., recognize arithmetic functions in the HDL code and implement these functions using carry logic. Other functions such as wide logic gates and cascade circuits can also be implemented using carry logic. However, these other types of functions used in HDL code are not so implemented by the synthesis tools, even when the method that is used results in a much slower circuit. It would be desirable, therefore, for synthesis tools to implement logic in a manner that makes better use of the carry structure in order to minimize the delay of the circuit.

SUMMARY OF THE INVENTION

According to the invention, logic functions that can be implemented by the carry chain are detected, and if the carry chain implementation is faster than a conventional implementation, the functions are implemented using the carry chain. In the general case, to be implemented in a carry chain, the functions must be of a form that each logic operator operates on the output of a previous portion of the function. That is, the function must be able to be put into the form $$F = (((\ldots (f_0 \$ f_1) \$ f_2) \$ f_3) \ldots \$ f_n)$$

where $f_0$ through $f_n$ represent portions of the function that can be implemented in a single LUT, and $ represents a logic operator such as AND, OR, XNOR, etc. When implemented in an FPGA having four-input lookup tables, the above form covers a very large number of functions because each of $f_0$ through $f_n$ can be any function of four or fewer input values. Further, the $ operators may occur in any order.

The simplest example, very commonly used, is a wide AND function in which the number of inputs is larger than the number of inputs to a single LUT. If software detects a number of inputs greater than a selected threshold, software will implement the function with adjacent LUTs and associated carry multiplexers. The software will assign the AND gate inputs to adjacent lookup tables, will assign a logic 1 to a carry-in input of the carry-chain multiplexer controlled by the first LUT, will assign logic 0 to the independent input of each carry-chain multiplexer being used to implement the AND function, will assign the AND function to each LUT in the chain implementing the function, and will take the wide AND output from the last carry-chain multiplexer implementing the function.

A wide OR gate is implemented similarly. However, each LUT is programed to generate the NOR function, the first carry multiplexer will receive logic 0 on its carry-in input and each carry multiplexer will receive logic 1 on its independent input.

When the software implements a function having mixed operators, it determines the state of the independent carry multiplexer input and the state of the carry-in input from the type of operator that follows.

The above summary of the present invention is not intended to describe each disclosed embodiment of the present invention. The figures and detailed description that follow provide additional example embodiments and aspects of the present invention.

BRIEF DESCRIPTION OF THE DRAWINGS

The present invention is illustrated by way of example, and not by way of limitation, in the following figures, in which like reference numerals refer to similar elements.

Figure 1:
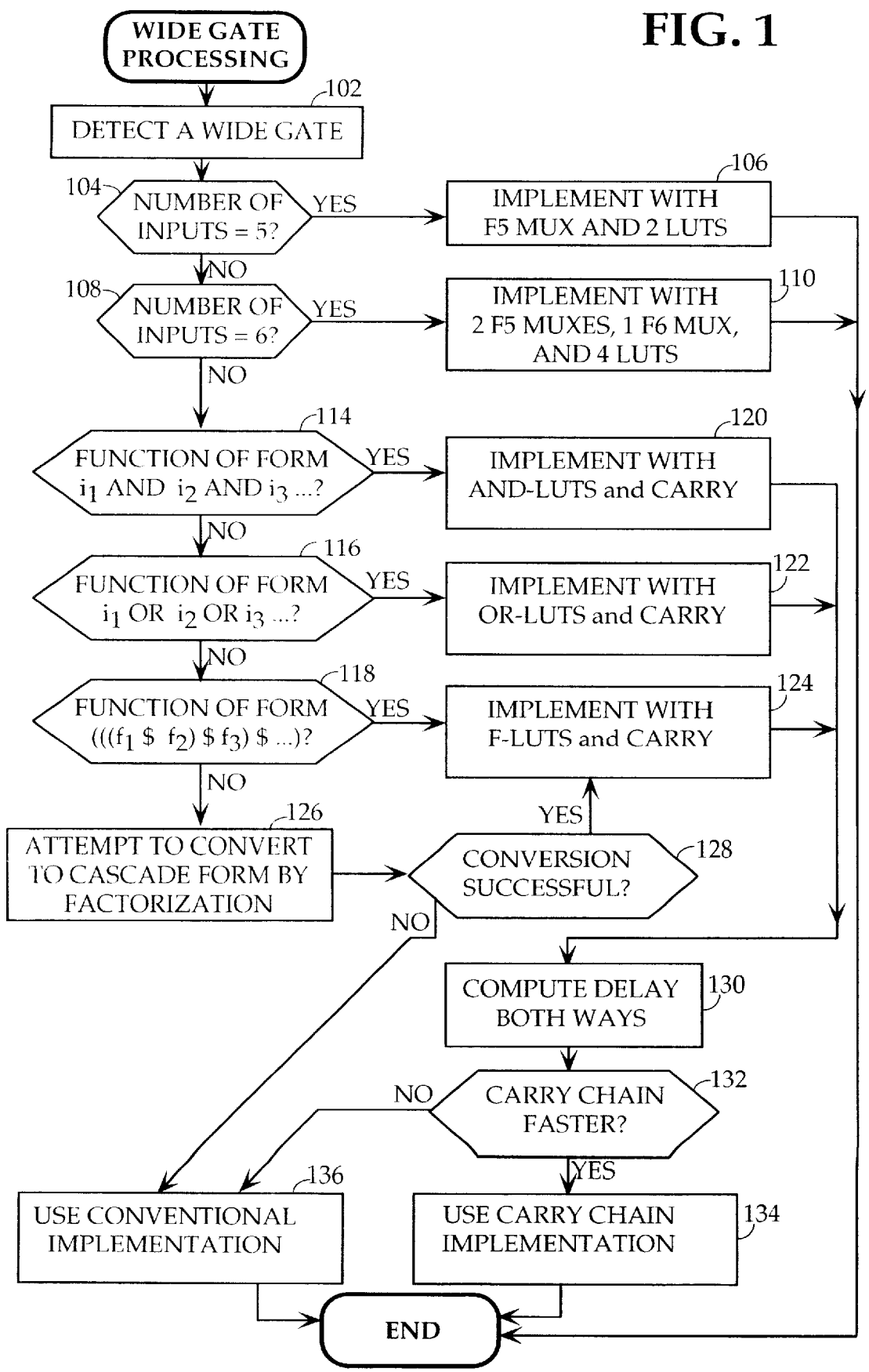
FIG. 1 comprises a flowchart of processing performed in implementing wide gates according to an example embodiment of the invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

Several examples of FPGA carry logic implementing wide gates are described. In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Logic functions are often in the form of:

$F_{AND}=i_1 \text{AND} i_2 \text{AND} i_3 \text{AND} \ldots i_n;$ $F_{OR}=i_1 \text{ OR } i_2 \text{ OR } i_3 \ldots i_n;$ and $F_f=(((\ldots(f_0\$f_1)\$f_2)\$f_3)\ldots)\$f_m;$ where i is an input signal or its negation, f is an arbitrary function, and $ is an AND, OR, or XOR operator or a connector between terms on a tristate bus. These logic functions are commonly referred to as "wide gates" and are conventionally implemented with a hierarchy of LUTs. However, when implemented as such, the resulting design may be unnecessarily slow. In various example embodiments, the present invention implements these types of logic functions using the available architectural features of an FPGA, for example carry logic, to minimize the circuit delay introduced by the logic. In further embodiments, the carry logic implementation of wide gates can be used to implement tristate buses.

The example embodiments of the invention described herein reference various architectural features of the XC5200™ and Virtex™ FPGAs from XILINX. The XC5200 architecture is described in the Xilinx Data Book (1998), which is incorporated herein by reference. Relevant portions of the Virtex architecture are described by Young et. al in U.S. Pat. No. 5,914,616 based on application Ser. No. 08/806,997 filed Feb. 26, 1997 and issued Jun. 22, 1999. A structure for implementing wide XOR in a carry chain is described by Chaudhary in U.S. Pat. No. 5,889,411 based on application Ser. No. 08/815,027 filed Mar. 14, 1997 and issued Mar. 30, 1999. These patent applications are also incorporated herein by reference. It will be appreciated that the invention, while having embodiments described which are directed to features of the XC5200 and Virtex FPGAs, may be applied to other FPGAs having similar architectural features.

FIG. 1 comprises a flowchart for implementing wide gates according to an example embodiment of the invention. A logic function having fewer than a selected number of inputs, for example 6, can be implemented in a conventional manner. For a function having more than 6 inputs, the function is categorized according to whether AND operators, OR operators, or a combination thereof are used in the function. In another embodiment, the process also categorizes XOR operators and tristate buffers as able to be implemented in a carry chain. The function is then implemented accordingly with LUTs and carry logic. The process compares the performance, in terms of delay for example, of the carry logic implementation with a conventional implementation. The implementation having less delay is selected for use in the design.

At step 102 a wide gate function is detected, and if the number of inputs is equal to 5, for example, step 104 directs control to step 106 where the function is implemented with 2 LUTs and a multiplexer (e.g., the F5 multiplexer of a XC5200 or Virtex FPGA) in a conventional manner. If the number of inputs is 6, step 108 directs control to step 110 where the function is implemented with 4 LUTs, two F5 multiplexers, and one F6 multiplexer, for example. The F6 multiplexer is described in the above referenced patent application.

Figure 3:
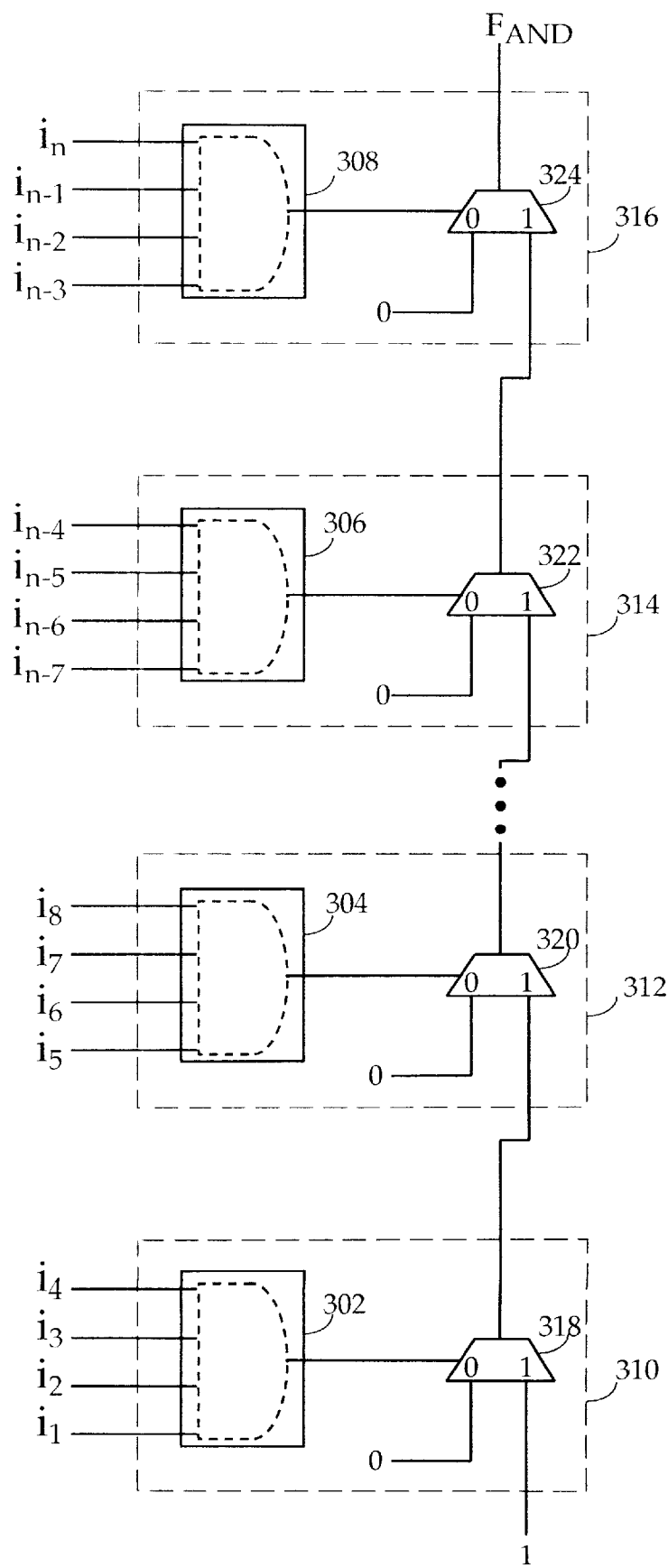
FIG. 3 is a circuit diagram that shows how a function of the form $F_{AND}=i_1$ AND $i_2$ AND $i_3$ AND ... AND $i_n$, can be implemented in accordance with an example embodiment of the invention.

For functions having more than a selected number of inputs, in this example 6, control moves to step 114. Steps 114, 116, and 118 determine the type of function based on the logic operators. Based on the type of function, selected features of the FPGA are selected for implementation. If a function is of the form $F_{AND}=i_1 \text{AND} i_2 \text{AND} i_3 \text{AND} \ldots i_n,$ where i is an input signal or its negation, the function is implemented at step 120 with AND-configured LUTs and cascaded carry logic. FIG. 3 shows an example implementation. The number of LUTs required is a function of the number of inputs available for each LUT. If each LUT has x inputs, then the number of LUTs required is ceil (x/4), where ceil is a ceiling or round-up function.

Figure 4:
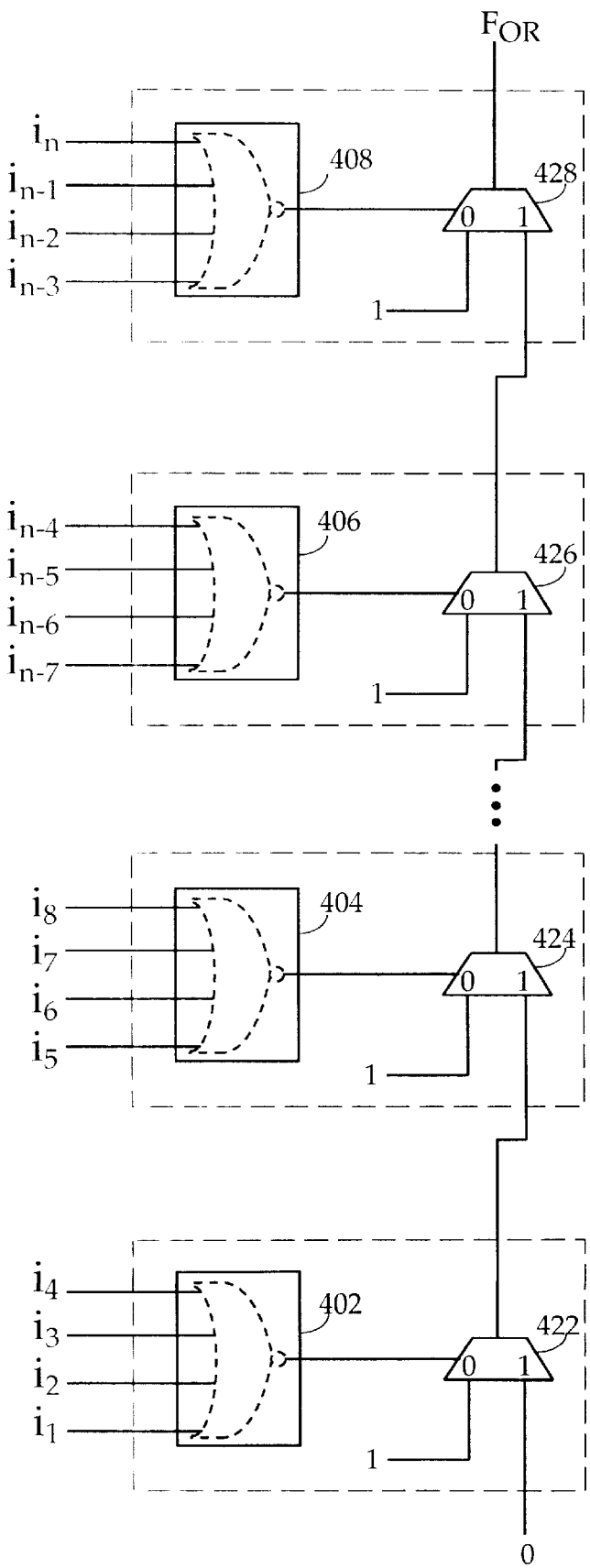
FIG. 4 is a circuit diagram that shows how a function of the form $F_{OR}=i_1$ OR $i_2$ OR $i_3$ OR ... OR $i_n$, can be implemented in accordance with an example embodiment of the invention.

If a function is of the form $F_{OR}=i_1 \text{OR} i_2 \text{OR} i_3 \ldots \text{OR} i_n,$ where i is an input signal or its negation, the function is implemented at step 122 with NOR-configured LUTs and cascaded carry logic. FIG. 4 shows an example implementation. The number of LUTs required is as described above.

Figure 5:
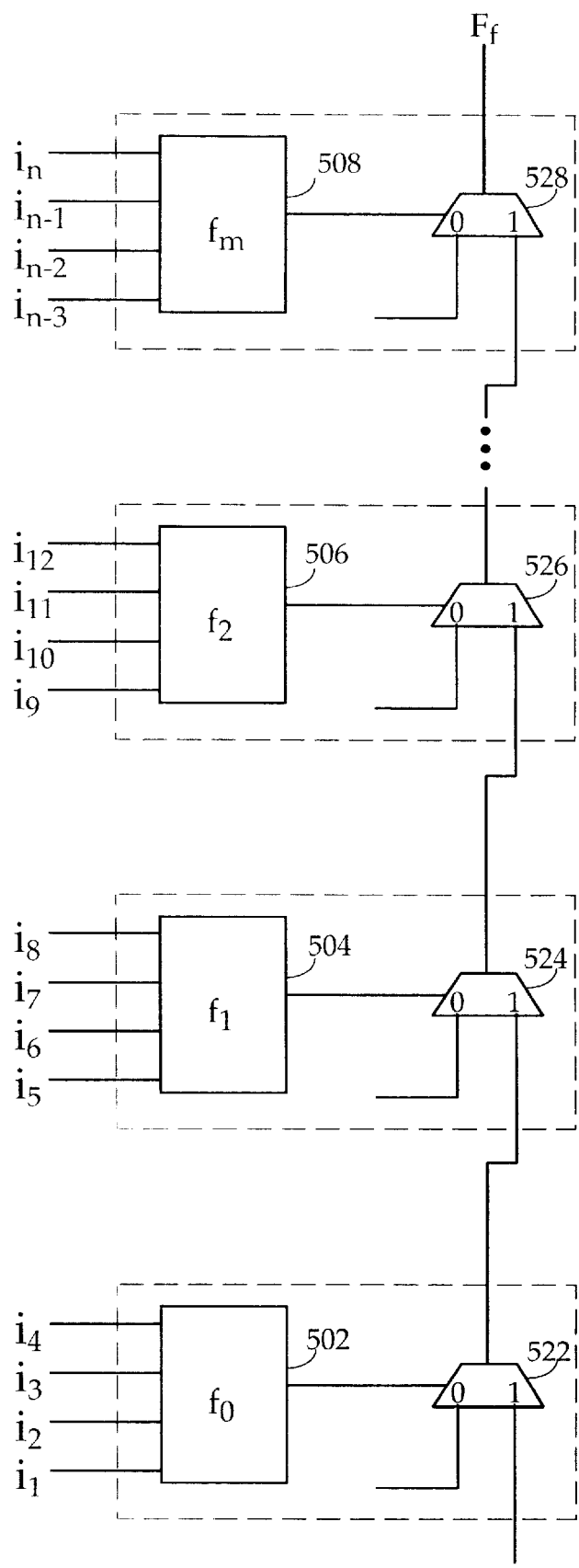
FIG. 5 is a circuit diagram that shows how a function of the form $F_f=(((\ldots(f_0\$f_1)\$f_2)\$f_3)\ldots)\$f_m$, can be implemented in accordance with the invention.

If a function is of the form $$F=(((\ldots(f_0\$f_1)\$f_2)\$f_3)\ldots\$f_m,$$

where $f_0$–$f_1$ are arbitrary functions of a selected number of inputs, for example 4, and where $ represents either an AND, an OR, or an XOR logic operator, then the function is implemented at step 124 with LUTs that implement the functions using cascaded carry logic. FIG. 5 illustrates this implementation. The number of LUTs required is as described above, and each of the LUTs implements a respective one of the functions. If the operator $ that follows a function $f_i$ is an AND, then the LUT implements the function and a logic 0 is applied to the independent carry multiplexer input. However, if the operator that follows a function is an OR, then the LUT implements the negation of the function and a logic 1 is applied to the independent carry multiplexer input.

For functions not satisfying any of the tests of steps 104–118, an attempt is made to convert the function to one of the forms described above using conventional factorization techniques, as shown by step 126 (FIG. 1). If the factorization is successful, the function is implemented as described in step 124. Control then moves to step 130.

At step 130, the delay of the implementation is calculated, wherein the implementation is one of the implementations of steps 120, 122, 124, or 126. The delay of the implementation is:

$$\text{Delay}=d0+n*d1$$

where n is the number of carry multiplexers, and d0 and d1 are delay factors for the particular FPGA. The d0 factor represents the delay in getting from a LUT input signal to the carry multiplexer select input driven by the LUT and through that carry multiplexer. The d1 factor represents the delay in getting from one carry multiplexer output to the next carry multiplexer output. The delay factors may vary by architecture and speed of the FPGA. Example delay factors for a Virtex FPGA are d0=2.0 and d1=0.1.

At step 132, the delay is compared to that of a conventional implementation. It will be appreciated that implicit in the comparison of test 132 is the generation of a conventional implementation of the function. If the delay is less than the delay of a conventional implementation, step 134 selects the implementation of one of steps 120, 122, or 124. Otherwise, step 136 selects the conventional implementation. It will be appreciated that in the example embodiment, the selected implementation is a netlist that is used in creating the programming bitstream for a FPGA.

Figure 2A:
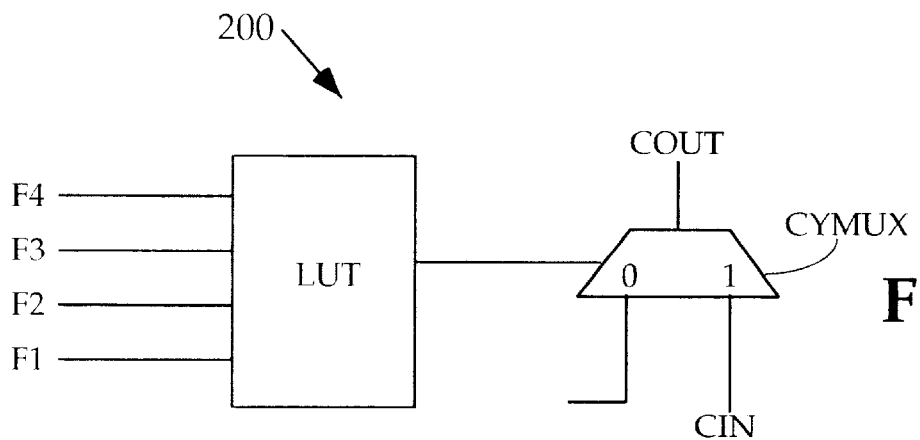
FIGS. 2A through 2C are alternative circuit diagrams of a portion of a configurable logic block (CLB)

FIG. 2A is a circuit diagram of a portion of a configurable logic block (CLB) with which the invention may be used. The circuit 200 is simplified in that it only includes those elements needed to understand the present invention. The circuit elements of FIG. 2A are common to several Xilinx architectures including the XC5200 and Virtex FPGAS, and both the XC5200 and Virtex FPGAs have additional circuit elements that are not shown.

Circuit 200 includes a carry multiplexer CYMUX having a "1" input terminal coupled to carry input line CIN and a "0" input terminal. In a Virtex FPGA, the 0 input terminal is driven by a select multiplexer shown in FIG. 2C and discussed below. The carry multiplexer CYMUX also has a carry output terminal coupled to carry output line COUT and a carry select terminal coupled to the output terminal of lookup table LUT. Input lines F1, F2, F3, and F4 provide input signals to lookup table LUT. Carry output line COUT is available to be coupled to a carry input line CIN of another instance of circuit 200. Carry input line CIN is available to be coupled to the carry output line COUT of yet another instance of circuit 200 to create a "carry chain" or "cascaded" carry logic. Since the circuit is programmable, the length of the carry chain can be programmably varied, based on the number of such circuits needed to implement a given carry chain.

Figure 2B:
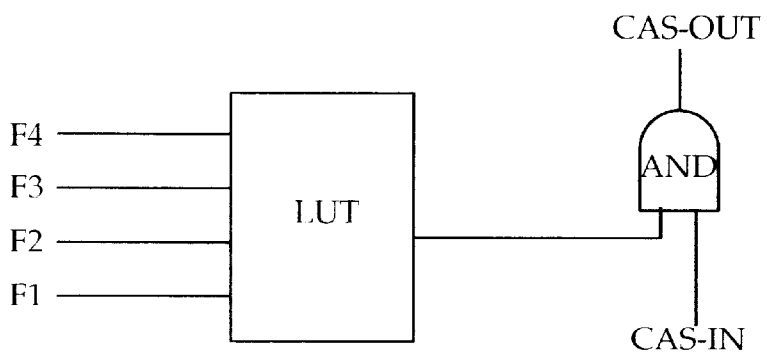

FIG. 2B shows a cascade circuit with which the present invention can also be used. Instead of multiplexer CYMUX, the circuit of FIG. 2B includes an AND gate. The AND gate of FIG. 2B is functionally equivalent to the multiplexer of FIG. 2A when the multiplexer of FIG. 2A receives a constant 0 on its 0-input terminal. The structure of FIG. 2B can also implement other functions than the AND function because it receives input signals from programmable sources. In particular, this structure can implement a wide OR gate. The LUT feeding one AND gate input terminal is of course programmable. The signal feeding the CAS-IN terminal is also programmable since eventually it comes from a LUT below or from a default input signal below.

Figure 2C:
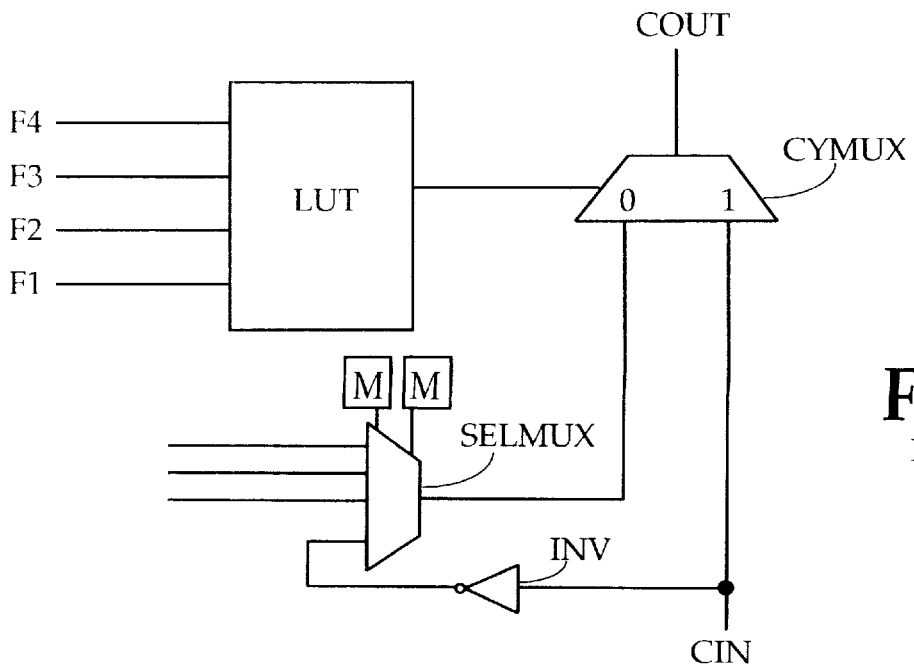

FIG. 2C shows part of the architecture described by Chaudhary in U.S. Pat. No. 5,889,411 for implementing XOR gates in the carry chain. An inverter INV receives the carry-in signal CIN, inverts it, and provides the inverted carry-in signal to a select multiplexer SELMUX. If memory cells M have programmed SELMUX to select the inverted carry-in signal, the carry chain will implement a wide XOR function where the lookup table LUT provides one of the terms in the wide XOR function.

The present invention will work with any of the FPGA architectures of FIGS. 2A through 2C.

FIG. 3 is a circuit diagram that shows how a function of the form, $$F_{AND}=i_1\text{AND}i_2\text{AND}i_3\text{AND}\ldots i_n,$$

can be implemented in accordance with an example embodiment of the invention. As explained above, the number of LUTs required to implement $F_{AND}$ is based upon the number of available inputs to a LUT. LUTs 302, 304, 306, and 308 each have 4 available inputs. Inputs $i_1$–$i_4$ are coupled to the inputs of LUT 302, inputs $i_5$–$i_8$ are coupled to the inputs of LUT 304, ..., the inputs $i_{(n-7)}$–$i_{(n-4)}$ are coupled to the inputs of LUT 306, and the inputs $i_{(n-3)}$–$i_n$ are coupled to LUT 308. Each of LUTs 302–308 implements an AND function of the respective inputs. Blocks 310, 312, 314, and 316 represent instances of the circuit 200 of FIG. 2 that are used to implement $F_{AND}$. While this and the following example embodiments use 4-input LUTs, it will be appreciated that the concepts of the invention as applied to 4-input LUTs could be extended to embodiments having LUTs with greater than 4 inputs, for example, 8 or 16 inputs, or extended to LUTs with fewer than 4 inputs, for example 2 or 3 inputs.

The respective outputs of the LUTs 302–308 are coupled to the select input terminals of the carry multiplexers 318, 320, 322, and 324. The output of a LUT selects between a constant logic level 0 at the 0-terminal of a carry multiplexer and the carry-in signal at the 1-terminal of the carry multiplexer. Logic level 1 is input to the 1-terminal of the first carry multiplexer 318 in the carry chain, and the output terminals of carry multiplexers 310–314 are coupled to the 1-input terminals of successive carry multiplexers in the carry chain. For example, the output of carry multiplexer 318 is coupled to the 1-input terminal of carry multiplexer 320. The $F_{AND}$ signal is provided at the output of carry multiplexer 324. It will be appreciated that the means by which logic level 0 is input to the carry multiplexers 318–324 may vary according to the FPGA architecture.

FIG. 4 is a circuit diagram that shows how a function of the form $$F_{OR}=i_1 OR i_2 OR i_3 \ldots OR i_n,$$

can be implemented. The input signals $i_1$–$i_n$ are coupled to respective LUTs 402, 404, 406, and 408 as explained above for the function $F_{AND}$. Each of the LUTs 402–408 is configured to implement a NOR function. The outputs of the LUTs 402–408 are coupled to respective carry multiplexers 422, 424, 426, and 428. The 0-input terminals of the carry multiplexers 422–428 have a constant logic level 1 input. Logic level 0 is input to the 1-terminal of the first carry multiplexer 422 in the carry chain, and the output terminals of the carry multiplexers 422–426 are coupled to the 1-input terminals of other carry multiplexers in the carry chain. The output of the carry multiplexer 428 provides the $F_{OR}$ function.

FIG. 5 is a circuit diagram that shows how a function of the form, $$F_f=((( \ldots (f_0 \$ f_1) \$ f_2) \$ f_3) \ldots \$ f_m$$

can be implemented in accordance with an example embodiment of the invention. The input signals $i_1$–$i_n$ are coupled to respective LUTs 502, 504, 506, and 508. The inputs $i_1$–$i_4$ that are associated with function $f_0$ are coupled to LUT 502, the inputs $i_5$–$i_8$ that are associated with function $f_1$ are coupled to LUT 504, ..., and the inputs $i_{(n-3)}$–$i_n$ that are associated with function fm are coupled to LUT 508.

Each of the LUTs 502–508 implements one of functions $f_1$–$f_m$, or its negation. If the $ operator that follows a function $f_i$ is an AND, then the function $f_i$ is implemented and the independent input to the associated carry multiplexer is logic 0. If the $ operator that follows a function $f_i$ is an OR, then the function $\sim f_i$ is implemented ("$\sim$" denotes negation) and the independent input to the associated carry multiplexer is logic 1. If the $ operator that follows a function $f_i$ is an XOR function (avavilable in FPGAs having the carry chain shown in FIG. 2C), then memory cells of the next CLB (above COUT in FIG. 2C) are programmed to provide the carry-in inverse to the 0-input terminal of the carry multiplexer.

Figure 5A:
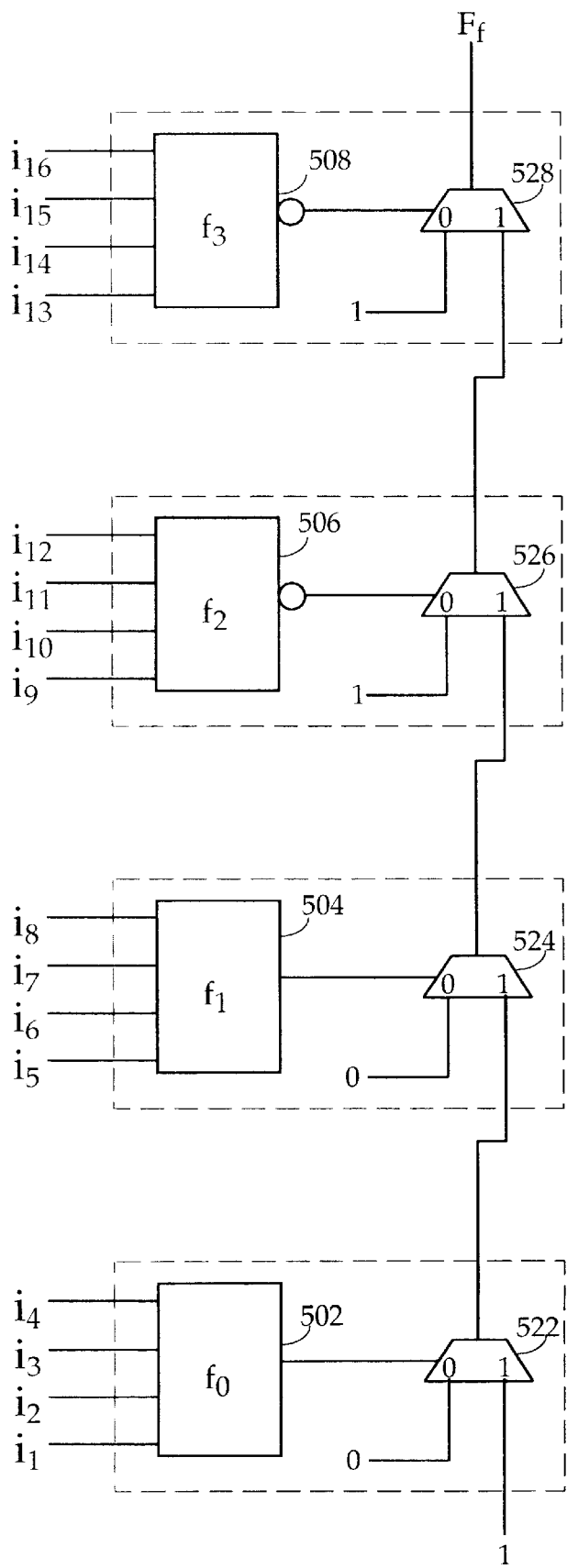
FIG. 5A shows an example function of the form in FIG. 5 and its implementation.

FIG. 5A shows implementation of an example function $$F_f=(((f_0 AND f_1) OR f_2) OR f_3)$$

In the example of FIG. 5A, the operator $ that follows $f_0$ is an AND, the operator $ that follows $f_1$ is an OR, and the operator $ that follows $f_2$ is an OR. Note that the last function $f_3$ has no operator that follows it and the function itself is implemented with the lookup table 508.

The outputs of the LUTs 502–508 are coupled to respective carry multiplexers 522, 524, 526, and 528. The 0-input terminals of carry multiplexers 522 and 524 have a constant logic level 0 input. The 0-input terminals of carry multiplexers 526 and 528 receive a constant logic level 1 input. Logic level 1 is input to the 1-terminal of the first carry multiplexer 522 in the carry chain, and the output terminals of the carry multiplexers 522–526 are coupled to the 1-input terminals of other carry multiplexers in the carry chain. The output of the carry multiplexer 528 provides the $F_f$ function.

Tristate Bus Implementation

The above description discusses wide logic gates in detail. As discussed briefly above, it is also possible to use carry multiplexers to implement tristate buses. Tristate buses are used in various electronic systems to allow multiple devices to share a single resource, for example, a wire or a bus. For proper operation, only one device can drive the bus at any given time. When no device is driving the bus, the bus is said to be "tristated." Typically the bus line is connected to a pull-up or pull-down circuit so that when no devices are driving the bus, the bus has a definite logic level 1 or 0.

A multiplexer is used to select one of several devices to drive a bus so that the bus is driven to a valid logic level. Thus, a tristate bus with pull-up or pull-down circuitry is functionally equivalent to a multiplexer, and in many cases it is desirable to implement a tristate bus as a multiplexer.

The following HDL code defines an example tristate bus:

```
if (signal1 = 1)
    busVal = busIn1;
else
    busVal = 1'bZ;
if (signal2 = 1)
    busVal = busIn2;
else
    busVal = 1'bZ;
``` where 1' bZ is the default value on the bus. Signal1 is a signal for selecting an input signal busIn1 as the bus value, busVal. Similarly, signal2 is the signal for selecting busIn2 as the bus value. Thus, when signal1 is logic level 1, the bus value is busIn1; when signal2 is logic level 1, the bus value is busIn2; otherwise, the bus is driven to a known logic level, for example, 1.

As represented in structural Verilog, a conventional tristate implementation is:

```
TBUF t1(inputVal(busIn1), enable(signal1),
    outputVal(busVal));
    TBUF t2 (inputVal(busIn2), enable(signal2),
    outputVal(busVal));
From the conventional tristate implementation, an
equivalent logic implementation can be derived as follows:
    AND a1(inp1(busIn1), inp2(signal1), out(tmp1));
    AND a2(inp1(busIn2), inp2(signal2), out(tmp2));
    OR o1(inp1(tmp1), inp2(tmp2), out(busVal));
```

Figure 6:
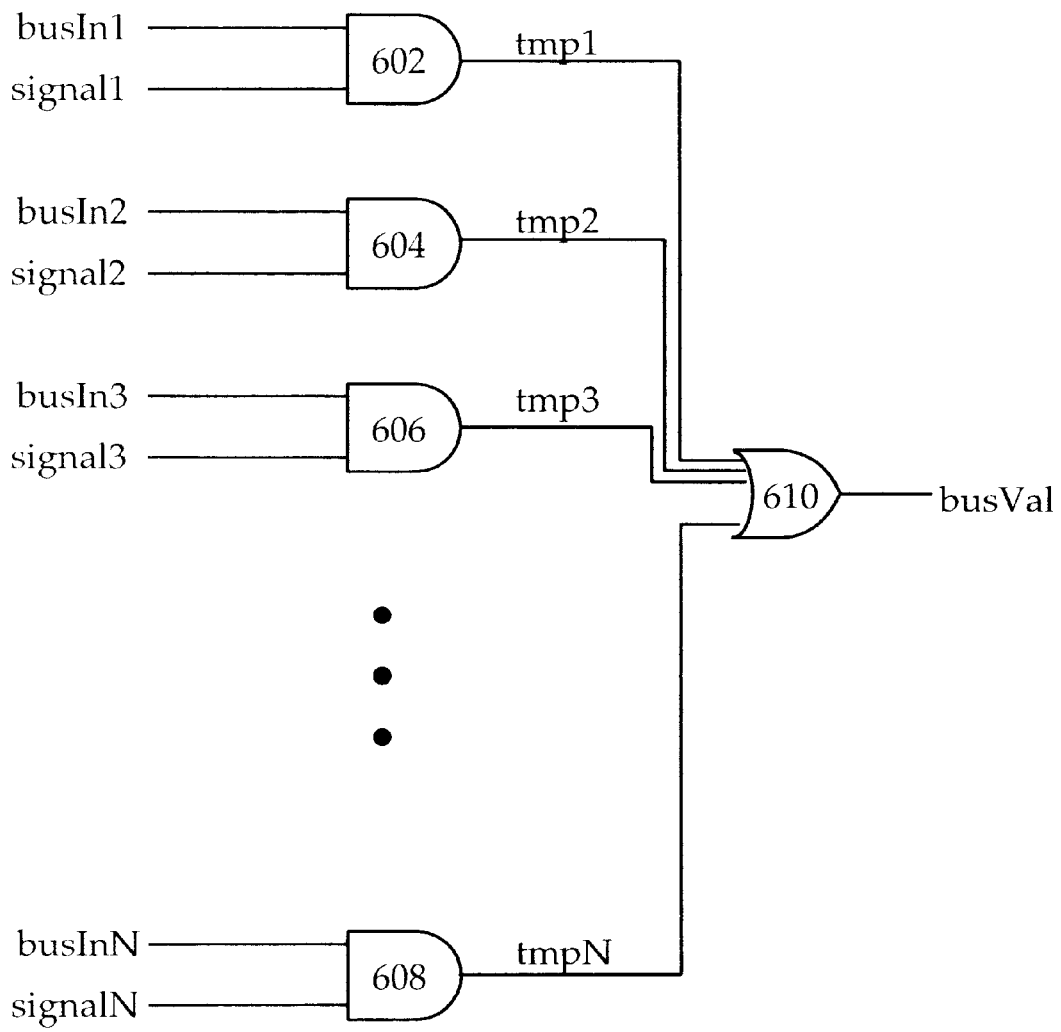
FIG. 6 is a diagram of logic that can be used to implement a tristate bus.

Expanding upon the preceding logic implementation by assuming that there are n bus selection signals and n bus input signals, the logic implementation can be illustrated as shown in FIG. 6.

FIG. 6 is a diagram of logic that can be used to implement a tristate bus. The example assumes that only one of the enable signals signal1-signalN is logic level 1 at any given time. Each bus input signal, busIni, is paired with a corresponding bus enable signal, signali, and input to one of AND gates 602, 604, 606 ... 608. The bus output signal, busVal, is output from OR gate 610, which receives as input intermediate signals that are the outputs of AND gates 602–608. Thus, only the enabled one of bus input signals busIn1 through busInN will drive the OR gate for supplying the output value busVal on the bus.

Several FPGA architectures include tristate buffers connecting LUT outputs to long interconnect lines in the interconnect structure of the FPGA. Thus these tristate buffers and long interconnect lines can be programmed to implement OR gate 610 shown in FIG. 6. But it may be desirable to implement OR gate 610 using a combination of LUTs and carry logic as described above. In addition, if more than a single signal were used to indicate bus input, the corresponding AND gate may also be suitable to implement with LUTs and carry logic.

It is possible to improve delay even further by merging the AND/OR functions of a tristate buffer.

Figure 7:
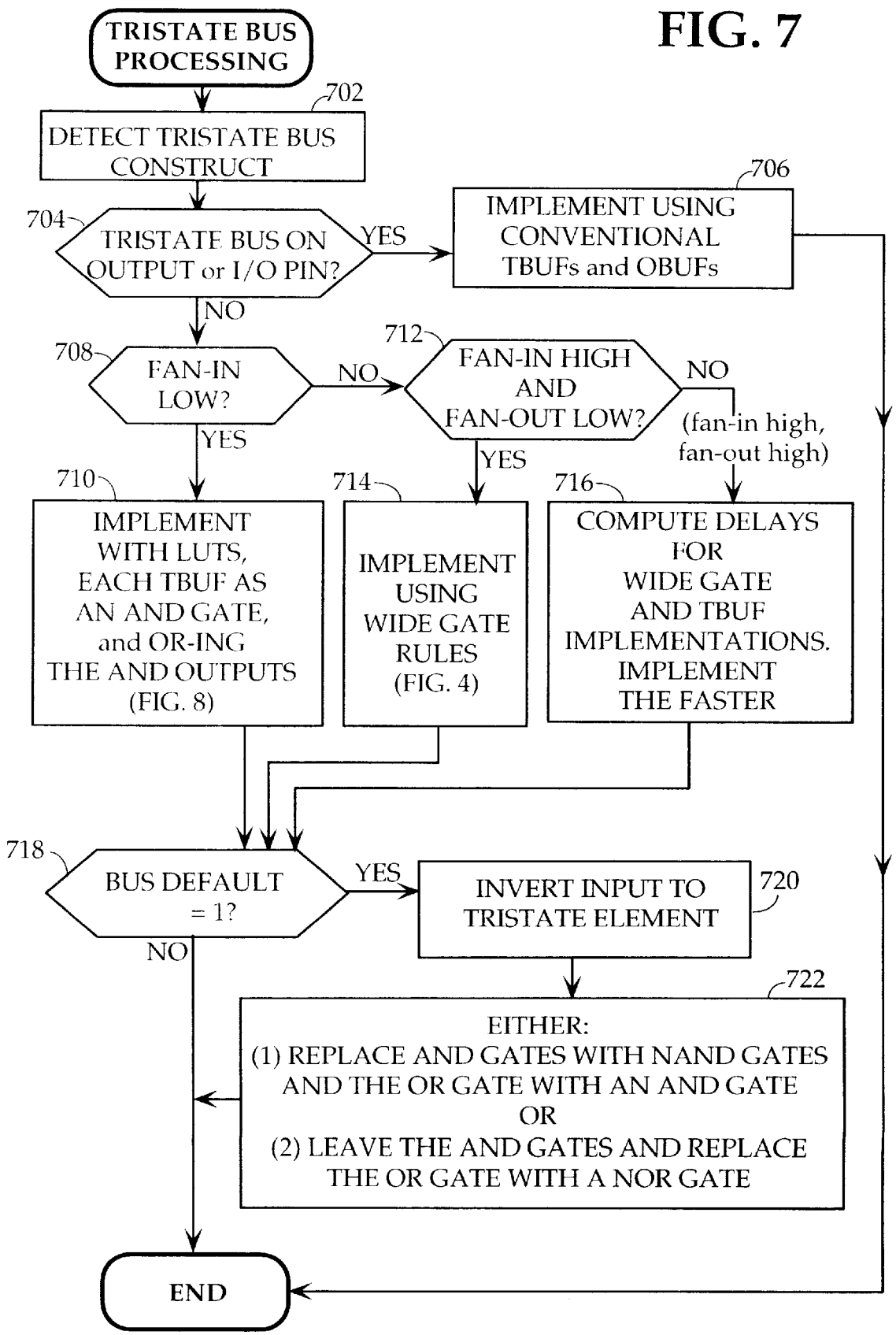
FIG. 7 is a flowchart of processing performed in implementing a tristate bus on an FPGA in accordance with an example embodiment of the invention.

FIG. 7 is a flowchart of processing performed in implementing a tristate bus on an FPGA in accordance with an example embodiment of the invention. In general, the process uses the number of drivers on the bus ("fan-in"), the number of loads on the bus ("fan-out"), and whether the tristate bus is connected to an output or input/output pin on the device to determine a suitable implementation for the bus.

A definition of a tristate bus is detected at step 702, and step 704 tests whether the bus is connected to an output pin or input/output pin. If so, the tristate bus is implemented at step 706 with conventional TBUFs and OBUFTs. Otherwise, processing proceeds to step 708.

If the fan-in for the bus is low relative to the number of inputs available on a LUT (for example less than or equal to 4), then the bus is implemented at step 710 with LUTs, where each TBUF and its tristate control are implemented in a LUT as a two-input AND gate. If more than one pair of a TBUF and its tristate control are implemented in one LUT, the outputs of the AND gates are provided as input to a NOR gate in the LUT.

If the fan-in is high and the fan-out is low, step 712 directs control to step 714 where the tristate buffer is implemented using the implementations for $F_{AND}$, $F_{OR}$, and $F_f$ as described above in connection with FIGS. 3, 4, and 5. In the example embodiment, the fan-in is high if it is greater than 4 and the fan-out is low if it is less than or equal to 4.

Figure 8:
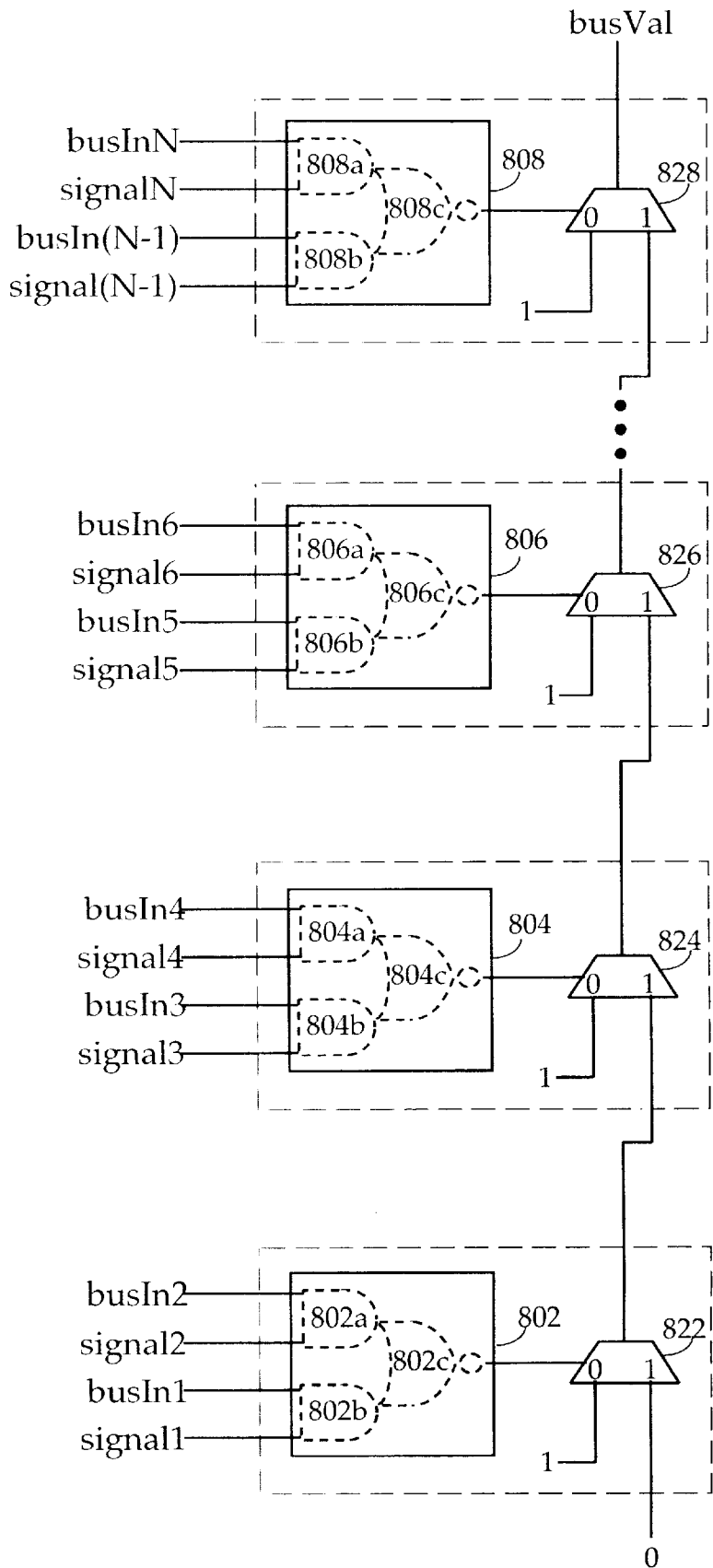
FIG. 8 shows a partial example implementation of a tristate bus using LUTs and FPGA carry logic.

FIG. 8 shows a partial implementation of a tristate bus in which the AND and OR functions are merged in single LUTs. Each stage in the chain implements a part of the OR function by implementing the NOR of two of the AND gates. The final OR is implemented by the carry chain. As discussed above for the wide OR gate example, when the OR function is being implemented by the carry chain, the intended function of each LUT is inverted. So here each LUT implements the NOR of the respective AND gate outputs.

Returning to FIG. 7, as shown at step 716, if the fan-in is high and the fan-out is high, the conventional TBUF and wide gate implementations are considered as implementation alternatives. The delays for both implementations are computed and compared. Conventional techniques can be used to determine the delay associated with the TBUF implementation, and the previously described method can be used for determining the delay of the wide gate implementation. The implementation having less delay is selected for use in the design.

The remaining steps of the process address implementing a bus default value of logic level 1. If a design calls for the bus to have a default value of logic level 1, step 718 directs control to step 720 where the bus inputs to the tristate circuitry are inverted. Referring to FIG. 6 for example, the signals busIn1, busIn2, busIn3, . . . , busInN would be inverted before input to the respective AND gates 602–608.

Along with inverting the bus inputs, the AND gates and OR gate (i.e., their LUT equivalents) must be changed as shown at step 722. There are two options for replacement: 1) the AND gates are changed to NAND gates and the OR gate is changed to an AND gate, or 2) the AND gates are not changed and the OR gate is changed to a NOR gate.

Turning now to FIG. 8, a partial implementation of a tristate bus is illustrated. Specifically, the OR gate 610 of FIG. 6 is implemented with ceil(n/4) LUTS, where n is the number of bus drivers. The LUTs are referenced as 802, 804, 806, and 808. Each of the LUTs 802–808 receives as input a respective set of four of the signals busin1, signal1, busin2 and signal2.

The structure of FIG. 8 places a default logic 0 onto the bus output line busVal if no enable signal signal1 through signalN enables its bus input signal busIn1 through busInN to drive the bus. Each logic block 802–808 is programmed to provide the inverted sum of products function, where if no signal is to drive the bus from that logic block, the logic block outputs a logic 1, which causes the carry multiplexer to pass its carry-in signal at the "1" terminal to the carry-out output terminal of the multiplexer. A high enable signal allows its associated busIn1 value to be placed on the bus, after a double inversion. For example, if signal5 carries a logic 1, the value at busIn5 will be passed by AND gate 806b and inverted by NOR gate 806c. The value on the carry-in terminal of multiplexer 826 will be logic 0 because the outputs of logic blocks 802 and 804 will have been logic 1 as determined by signals signal1 through signal4 being logic 0. Thus the original logic 0 at the carry-in terminal of multiplexer 822 will have propagated to multiplexer 826. So if the signal on busIn5 is logic 1, logic block 806 will output logic 0, causing multiplexer 826 to propagate the logic 1 on its 0 input terminal. This signal will propagate to the output of multiplexer 828 and thus be the value busVal.

While not shown, it will be appreciated that the circuitry that supplies signals busin1, signal1, busin2 and signal2 could be implemented with a suitable configuration of wide-AND logic if more than a selected number of signals ANDed together were used to select a bus input signal.

The method of the invention for implementing wide logic functions in carry logic has been described using the XC5200 and Virtex FPGA architectures as examples. It will be apparent to one skilled in the art after reading this specification that the present invention may be practiced with other FPGA architectures as well as those illustrated herein, as well as in other programmable ICs such as metal-programmable devices designed to emulate FPGAs.

Those having skill in the relevant arts of the invention will now perceive various modifications and additions which may be made as a result of the disclosure herein. Accordingly, all such modifications and additions are deemed to be within the scope of the invention, which is to be limited only by the appended claims and their equivalents.

What is claimed is:

1. A method for implementing a logic function in a programmable IC having lookup tables controlling multiplexers of a carry chain, comprising the steps of:

detecting a function having a number of inputs greater than a selected threshold;

determining whether the function can be of the form $F=((( \ldots (f_0 \, \$ \, f_1) \, \$ \, f_2) \, \$ \, f_3) \ldots \$ \, f_n)$ where $f_0$ through $f_n$ represent portions of the function F that can be implemented in a single LUT, and $ represents a logic operator;

implementing the functions $f_0$ through $f_n$ in successive lookup tables; and implementing the logic operators in corresponding multiplexers of the carry chain.

2. The method of claim 1 wherein each $ represents an AND function.

3. The method of claim 1 wherein each $ represents an OR function.

4. The method of claim 1 wherein the function is a mixed function in which the $ represents both AND and OR operators.

5. A method for implementing logic functions in an FPGA, comprising the steps of:

detecting an AND function having a number of inputs that is greater than a selected threshold and having all AND operators connecting the inputs; and implementing the AND function with a plurality of lookup tables, each lookup table implementing an AND function for selected ones of the inputs and having an output coupled to a selection input of a respective one of a plurality of carry multiplexers, each carry multiplexer having an output and first and second input terminals, wherein a first one of the carry multiplexers has a second input terminal arranged to receive a logic one level signal, a last one of the carry multiplexers has an output terminal arranged to provide an output signal for the AND function, and the second input terminal of each remaining carry multiplexer is coupled to the output terminal of another one of the remaining carry multiplexers.

6. The method of claim 5, further comprising:

computing a first delay value of a first implementation, the first implementation including the plurality of lookup tables and carry multiplexers;

implementing the AND function as an alternative second implementation;

computing a second delay value of the second implementation; and selecting a one of the first implementation or the second implementation having less delay.

7. The method of claim 6, wherein the first delay value is a function of a number of carry multiplexers.

8. The method of claim 7, wherein the first delay value is further a function of delay factors associated with the FPGA.

9. The method of claim 8, wherein the delay factors include a first delay factor, d0, and a second delay factor, d1, and the first delay value is equal to d0+d1*n, where n is the number of the first plurality of carry multiplexers.

10. The method of claim 5, wherein each of the lookup tables has 4 inputs.

11. A method for implementing logic functions in an FPGA comprising the steps of:

detecting an OR function having a number of inputs that is greater than a threshold and all OR operators connecting the inputs; and implementing the OR function with a plurality of lookup tables and a plurality of carry multiplexers, each lookup table implementing a NOR function of selected ones of the inputs and having an output coupled to a selection input of a respective one of the plurality of carry multiplexers, each carry multiplexer having an output terminal and first and second input terminals, wherein a first one of the carry multiplexers has a second input terminal arranged to receive a logic level zero signal, a last one of the second plurality of carry multiplexers has an output terminal arranged to provide an output signal for the OR function, and the second input terminal of each remaining carry multiplexer is coupled to the output terminal of another one of the remaining carry multiplexers.

12. The method of claim 11, further comprising:

computing a first delay value of a first implementation, the first implementation including the plurality of lookup tables and the second plurality of carry multiplexers that implement the OR function;

implementing the OR function as an alternative second implementation;

computing a second delay value of the second implementation; and selecting a one of the first implementation or the second implementation having a lesser delay value.

13. The method of claim 11, further comprising arranging the first input terminals of the first plurality of carry multiplexers to receive a logic level 0 signal.

14. The method of claim 13, further comprising arranging the first input terminals of the second plurality of carry multiplexers to receive a logic level 1 signal.

15. A method for implementing a function in an FPGA comprising:

detecting a function having a number of inputs that is greater than a threshold and having a plurality of arbitrary sub-functions, each sub-function having no more than n inputs, where n is equal to the threshold, and related to another one of the sub-functions with one of an AND, an OR, and an XOR operator and where the operators can be implemented in series; and implementing the function with a plurality of lookup tables, each of the sub-functions implemented in a respective one of the plurality of lookup tables, wherein a lookup table implements the sub-function if a following operator is an AND operator and implements a negation of the sub-function if a following operator is an OR operator, wherein outputs of the lookup tables are respectively coupled to selection inputs of a plurality of carry multiplexers, each of the carry multiplexers having an output terminal and first and second input terminals, a last one of the carry multiplexers providing an output signal for the function, and the second input terminal of each carry multiplexer being coupled to the output terminal of another one of the carry multiplexers.

16. The method of claim 15, further comprising:

computing a first delay value of a first implementation, the first implementation including the plurality of lookup tables and the carry multiplexers that implement the function;

implementing the function as an alternative second implementation;

computing a second delay value of the second implementation; and selecting a one of the first implementation or the second implementation having less delay.

17. The method of claim 15, further comprising arranging the first input terminal of a carry multiplexer to receive a logic level 0 signal if the following operator is an AND operator and arranging the first input terminal of the carry multiplexer to receive a logic level 1 signal if the following operator is an OR operator.

18. A method for implementing logic functions in a programmable IC, comprising the steps of:

detecting an OR function having a number of inputs that is greater than a threshold and all OR operators connecting the inputs; and implementing the OR function with a plurality of lookup tables, each lookup table implementing a NOR function of selected ones of the inputs and having an output coupled to a selection input of a respective one of a plurality of carry multiplexers, each carry multiplexer having an output and first and second input terminals, wherein a first one of the carry multiplexers has a second input terminal arranged to receive a logic zero signal, a last one of the carry multiplexers has an output terminal arranged to provide an output signal for the OR function, and the second input terminal of each carry multiplexer is coupled to the output terminal of another one of the carry multiplexers.

19. A method for implementing logic functions in an FPGA, comprising the steps of:
   detecting a function having a number of inputs that is greater than a threshold and having a plurality of arbitrary sub-functions, each function having a number of inputs less than or equal to the threshold and related to another one of the sub-functions with one of an AND, an OR, and an XOR operator; and
   implementing the function with a plurality of lookup tables, each of the sub-functions implemented by a respective one of the plurality of lookup tables, wherein outputs of the lookup tables are respectively coupled to selection inputs of a plurality of carry multiplexers, each of the carry multiplexer having an output and first and second input terminals, a last one of the carry multiplexers having an output terminal to provide an output signal for the function, one input terminal of each carry multiplexer being coupled to the output terminal of one of the remaining carry multiplexers.

20. A method for implementing a tristate bus using carry or cascade logic and LUTs in an FPGA, each LUT providing a LUT output signal, the method comprising the steps of:
   detecting a tristate bus definition wherein each tristate bus input includes an input signal and a tristate control signal;
   assigning pairs of input signal and tristate control signal to a single LUT configured to implement a sum-of-products of the pairs assigned to the single LUT; and
   combining LUT output signals in a carry or cascade chain on the FPGA.

21. A method for implementing a tristate bus using FPGA carry logic, comprising the steps of:
   detecting a tristate bus definition, the tristate bus definition including a plurality of bus input signals and a plurality of bus select signals, each of the bus input signals associated with one or more of the bus select signals; and
   implementing the tristate bus definition with a plurality of lookup tables and a plurality of carry multiplexers connected in a chain, each carry multiplexer having a select input controlled by a corresponding lookup table, each lookup table implementing at least one two-input function from the group AND, OR, NAND, and NOR of a bus input signal and its tristate control signal.

22. The method of claim 21, further comprising implementing the tristate bus with a second alternative implementation if fan-in for the tristate bus is less than a selected threshold.

23. The method of claim 21, wherein the tristate bus is implemented with the plurality of lookup tables and carry multiplexers if the fan-in for the tristate bus is greater than a selected threshold.

24. The method of claim 21, wherein the tristate bus is implemented with the plurality of lookup tables and carry multiplexers if the fan-in for the tristate bus is greater than a selected fan-in threshold, and the fan-out for the tristate bus is less than a selected fan-out threshold.

25. The method of claim 21, further comprising:
   implementing the tristate bus with a second alternative implementation if fan-in for the tristate bus is greater than a first selected threshold and fan-out for the tristate bus is greater than a second selected threshold;
   computing a first delay value of a first implementation, the first implementation including the plurality of lookup tables and the plurality of carry multiplexers;
   computing a second delay value of a second implementation; and
   selecting a one of the first implementation or the second implementation having a lesser delay value.

26. The method of claim 25, wherein the first delay value is a function of a number of the plurality of carry multiplexers.

27. The method of claim 26, wherein the first delay value is further a function of delay factors associated with the FPGA.

28. The method of claim 27, wherein the delay factors include a first delay factor, d0, and a second delay factor, d1, and the first delay value is equal to d0+d1*n, where n is the number of the plurality of carry multiplexers.

29. The method of claim 21, wherein the tristate bus is implemented with the plurality of lookup tables and carry multiplexers if the tristate bus is not connected to a device output or input/output pin.

30. The method of claim 21, wherein a default signal for the tristate bus is logic level 0.

31. The method of claim 21, wherein if a default signal for the tristate bus is logic level 1, then:
   each LUT implements a NOR function of AND functions of pairs of inverted input signal and non-inverted tristate control signal, and
   a final output of the carry chain is inverted.

32. The method of claim 21, further comprising arranging a first input terminal of a first one of the plurality of carry multiplexers to receive a logic level 1 signal.

33. The method of claim 32, wherein a selected logic level signal provided to a second input terminal of the first one of the carry multiplexers is logic level 0.

34. A method for implementing a logic function in a programmable IC having lookup tables controlling AND gates of a cascade chain, comprising the steps of:
   detecting a function having a number of inputs greater than a selected threshold;
   determining whether the function can be of the form $F = f_0 \text{ AND } f_1 \text{ AND } f_2 \text{ AND } f_3 \ldots \text{ AND } f_n$ where $f_0$ through $f_n$ represent portions of the function that can be implemented in a single LUT;
   implementing the functions $f_0$ through $f_n$ in successive lookup tables; and
   implementing the logic operators in corresponding AND gates of the cascade chain.

35. A method for implementing a logic function in a programmable IC having lookup tables controlling AND gates of a cascade chain, comprising the steps of:
   detecting a function having a number of inputs greater than a selected threshold;
   determining whether the function can be of the form $F = f_0 \text{ OR } f_1 \text{ OR } f_2 \text{ OR } f_3 \ldots \text{ OR } f_n$ where $f_0$ through $f_n$ represent portions of the function that can be implemented in a single LUT, and $ represents an OR operator;
   implementing complements of the functions $f_0$ through $f_n$ in successive lookup tables; and
   implementing the logic operators in corresponding AND gates of the cascade chain.

* * * * *